H. W. RUTT.
Fence for Poultry Yard.
No. 77,101.
Patented April 21, 1868.
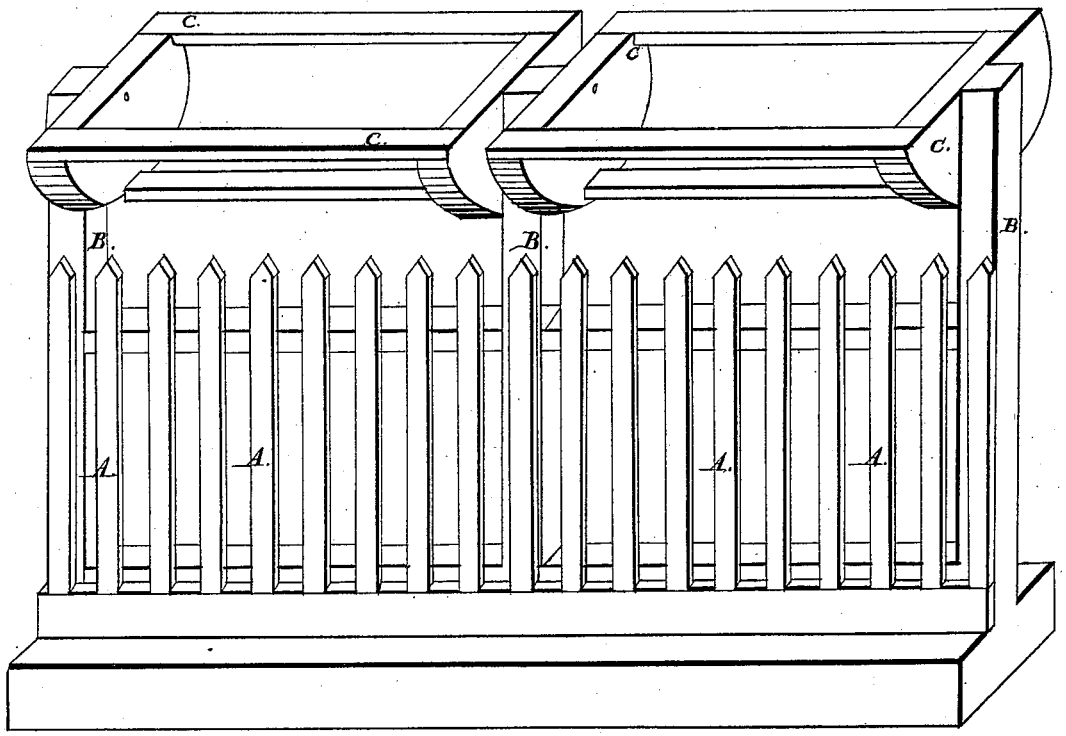
WITNESSES:
INVENTOR:

United States Patent Office.

HENRY W. RUTT, OF REEDSBURG, ASSIGNOR TO HIMSELF AND JONATHAN M. RHOADS, OF WAYNE COUNTY, OHIO.

Letters Patent No. 77,101, dated April 21, 1868.

IMPROVEMENT IN FENCES FOR POULTRY-YARDS.

The Schedule referred to in these Letters Patent and making part of the same.

TO ALL WHOM IT MAY CONCERN:

Be it known that I, HENRY W. RUTT, of Reedsburg, in the county of Wayne, and in the State of Ohio, have invented certain new and useful Improvements in Fences for Poultry-Yards; and do hereby declare that the following is a full, clear, and exact description thereof, reference being had to the accompanying drawings, and the letters of reference marked thereon. In the annexed drawings, making a part of this specification—

A represents the palings, and B the posts of an ordinary picket-fence. The posts B extend up somewhat above the palings, as shown, and have reels, C, pivoted between them. C represents a reel, which is made of two semicircular end-pieces, with three strips nailed or fastened to them, in the manner shown, and then hung or pivoted between the posts B.

Short posts may be secured to the top rail of any fence, and this reel C adjusted thereon. The reel C is designed to prevent the ingress or egress of fowls to or from an enclosure.

It will be seen that should any animal light upon either of the upper slats or rails of the reel, it would turn and throw said animal back on the same side it started. It is a well-known fact that hens and domestic fowls never pass over a fence or obstruction without first lighting thereon.

Thus it will be seen that my device is admirably adapted to poultry-yard and garden-fences.

Having thus fully described my invention, what I claim as new, and desire to secure by Letters Patent, is—

The reels C C, composed of two semicircular disks, connected together by a narrow slat at each side, and one at the bottom, and pivoted between the vertical fence-posts B B, directly above the fence, all constructed, arranged, and operating as specified.

In testimony that I claim the foregoing, I have hereunto set my hand, this 15th day of February, 1868.

HENRY W. RUTT.

Witnesses:
J. H. DOWNING,
C. C. PARSONS.